(12) United States Patent
Sabbah

(10) Patent No.: US 7,617,956 B1
(45) Date of Patent: Nov. 17, 2009

(54) COMBINATION BACKPACK AND REMOVABLE TROLLEY ASSEMBLY

(75) Inventor: Dan Sabbah, New York, NY (US)

(73) Assignee: Global Design Concepts, Inc., New York, NY (US)

( * ) Notice: Subject to any disclaimer, the term of this patent is extended or adjusted under 35 U.S.C. 154(b) by 362 days.

(21) Appl. No.: 11/489,225

(22) Filed: Jul. 19, 2006

(51) Int. Cl.
*A45C 1/04* (2006.01)
*A45C 5/14* (2006.01)
*A45F 4/00* (2006.01)
*B62B 13/02* (2006.01)

(52) U.S. Cl. ............... 224/153; 224/644; 224/649; 224/657; 224/583; 190/18 A; 280/37

(58) Field of Classification Search ............ 224/153, 224/644, 649, 583, 657; 190/18 A; 280/37, 280/47.315
See application file for complete search history.

(56) References Cited

U.S. PATENT DOCUMENTS

| | | | |
|---|---|---|---|
| 5,749,503 A | 5/1998 | Wulf et al. | |
| 5,797,617 A | 8/1998 | Lin | |
| 5,819,999 A * | 10/1998 | Tennant | 224/155 |
| 5,984,154 A | 11/1999 | Scicluna | |
| 6,070,888 A | 6/2000 | Wang | |
| 6,550,592 B1 * | 4/2003 | Godshaw et al. | 190/18 A |
| 6,595,334 B1 | 7/2003 | Saetia | |

* cited by examiner

*Primary Examiner*—Nathan J Newhouse
*Assistant Examiner*—Lester L Vanterpool
(74) *Attorney, Agent, or Firm*—Ladas and Parry LLP

(57) ABSTRACT

A backpack combination comprising a storage compartment having a front wall, a rear wall, a bottom wall, first and second side walls, and a top wall; shoulder straps affixed to the rear wall at upper and lower portions thereof; a first and second zipper means extending along the periphery of the rear wall from lower to upper portions thereof; a padded back panel congruent with the rear wall and having third and fourth zipper means along peripheral portions thereof adapted for selective connection to the first and second zipper means; a trolley having a support panel congruent with the rear wall and having fifth and sixth zipper means along peripheral portions thereof adapted for selective connection to the first and second zipper means.

6 Claims, 6 Drawing Sheets

COMBINATION BACKPACK AND REMOVABLE TROLLEY ASSEMBLY

BACKGROUND OF THE INVENTION

Backpacks and other luggage having permanently attached wheels for towing by extendable handles are well known to the art. In addition, backpacks and luggage having specially designed quick-connect and quick-disconnect trolley assemblies are also well known to the art.

It is to an improvement in luggage-trolley combinations for backpacks to which the present invention is directed. Specifically, the present invention includes a fabric backpack body having shoulder straps and a zippered, removable, cushioned back pad for use in supporting the backpack on the shoulders of the user. The backpack may be quickly converted into a wheelable piece of luggage by removal of the zippered, cushioned back pad and connection of the trolley through two multi-purpose zippers, which attach the trolley to the rear wall of the backpack body while covering the shoulder straps.

Backpacks having built-in trolleys and shoulder straps are shown in U.S. Pat. Nos. 5,749,503 and 5,984,154, both of which patents further disclose the concealment of the carrying straps by zippered cover panels when the trolley is deployed. However, these backpacks do not provide for the removal of the trolley when it is not in use. U.S. Pat. Nos. 5,797,617; 6,595,334; and 6,070,888 disclose specially designed trolleys for quick connection to luggage, including backpacks; however, none of these patents discloses a simple two-plane trolley of light weight and collapsible construction for connection by zippers about the entire periphery of the backpack, which zippers also selectively mount a cushioning pad.

More specifically, in the present invention a soft-walled backpack body is provided having a rear wall of tombstone configuration, i.e. a horizontal bottom, a curved top, and tapering side edges; a front wall generally congruent with the rear wall; and two side walls, a top wall, and a bottom wall connecting the front and rear walls. In addition, the backpack body may have a superimposed smaller front pocket and additional expandable side pockets if desired. Access to the major compartment of the backpack body between the front and the rear walls is provided by a zipper closure.

Shoulder straps are attached at the top and bottom portions of the backpack body for carrying the backpack on the shoulders of the wearer. In addition, the backpack body has a looped carrying handle secured to the upper portions of the back wall. Importantly a separate cushioned back pad, having a padded core, is removably connected to the backpack body by peripheral zippers on the rear wall.

In accordance with the invention, a very simple and efficient trolley assembly is provided. The trolley assembly includes a rigid planar support member congruent with the rear wall of the backpack body, to which support is affixed a rectangular frame comprised of an upper horizontal bracket member and a lower horizontal bracket member, both of which are riveted to the planar support member. The brackets each support vertical tubes into which a U-shaped projectile handle is disposed, the lower portions of the handle having friction members to permit the handle to be frictionally locked at its fully extended position.

The lower bracket also includes an integral horizontal plate member including two forwardly opening sockets. Beneath the sockets, the bracket includes downwardly depending axle supports having aligned apertures through which a simple short axle may be inserted and secured, the axles themselves before insertion and permanent attachment supporting two rollers or wheels. The trolley is completed by the insertion of two lightweight foot portions extending into the slots in the bracket to provide, in combination with the bracket, a horizontal planar support portion.

The backpack body is securely attached to the trolley by zippers extending from the bottom portions of the backpack body rear wall top portions, which mate with the same zipper portions sewn onto the periphery of the trolley support wall for attachment of the pad. Mating hooked and looped fastening strips are secured to the upper portions of the backpack rear wall and the trolley wall to align and secure one to the other during zipper attachment. In addition, hook and loop fastening strap members are attached to the bottom of the bottom wall of the backpack body and are wrapped about the projecting feet of the trolley. In this manner, the trolley may be readily attached to the backpack body in a manner which secures and totally encloses the shoulder straps and the carrying handle.

When the trolley is not needed and the backpack body is to be used simply as a backpack, the process is reversed. The trolley may be quickly removed by unzipping the peripheral zipper, separating the hook and loop connections, and then reattaching the cushioned back pad to the backpack body by the zippers.

For a more complete understanding of the present invention and a greater appreciation of its attendant advantages, reference should be made to the appended drawings.

DESCRIPTION OF THE DRAWINGS

Referring now to FIG. 1, the backpack of the present invention is fabricated from sewn-together fabric panels (nylon, cotton, polyester, or the like) referenced generally by 10 and includes a rear wall 11 of general tombstone shape having a lower horizontal edge 12, side edges 13 and 14, and a semicircular upper edge 15. A front wall 16 congruent with the rear wall 11 is connected thereto by a bottom panel 17 which extends between the lower edges 12 of the walls 11 and 16 and projects upwardly between the vertical side edges 13 and 14 to form lower side wall portions 18 having upper horizontal edges 19. Top wall portions 20 and 21 are affixed to the rear wall 11 and the front wall 16 about their peripheries from the top edge of the bottom wall, as will be understood. This completes the major stowage portion of the backpack. As is conventional, access to the backpack major portion may be had by the opening between the panels 20 and 21, which opening is selectively closed and opened by a zipper 22 attached to the opposed edges of the panels 21 and 20. Attached to the front wall 16 of the backpack is an auxiliary pocket 23 having a front wall 24, a bottom wall 25 which extends beneath the pocket and is attached to the pocket front wall 24 and pocket rear wall 26 with the pocket being accessible in the opening formed between the panels 25 and 26, which opening is closed by zipper 27 in the manner of the closure of the main compartment of the backpack. Padded shoulder straps 70, 71 are sewn to the upper central edge portions 15 of the rear wall. Lower adjusting straps 73, 74 are sewn to the lower edge portions 12 of the rear wall and adjustably connected to straps 70, 71 by buckles 75, 76, permitting adjustment of the effective length of the straps 70, 71.

Figure 4:
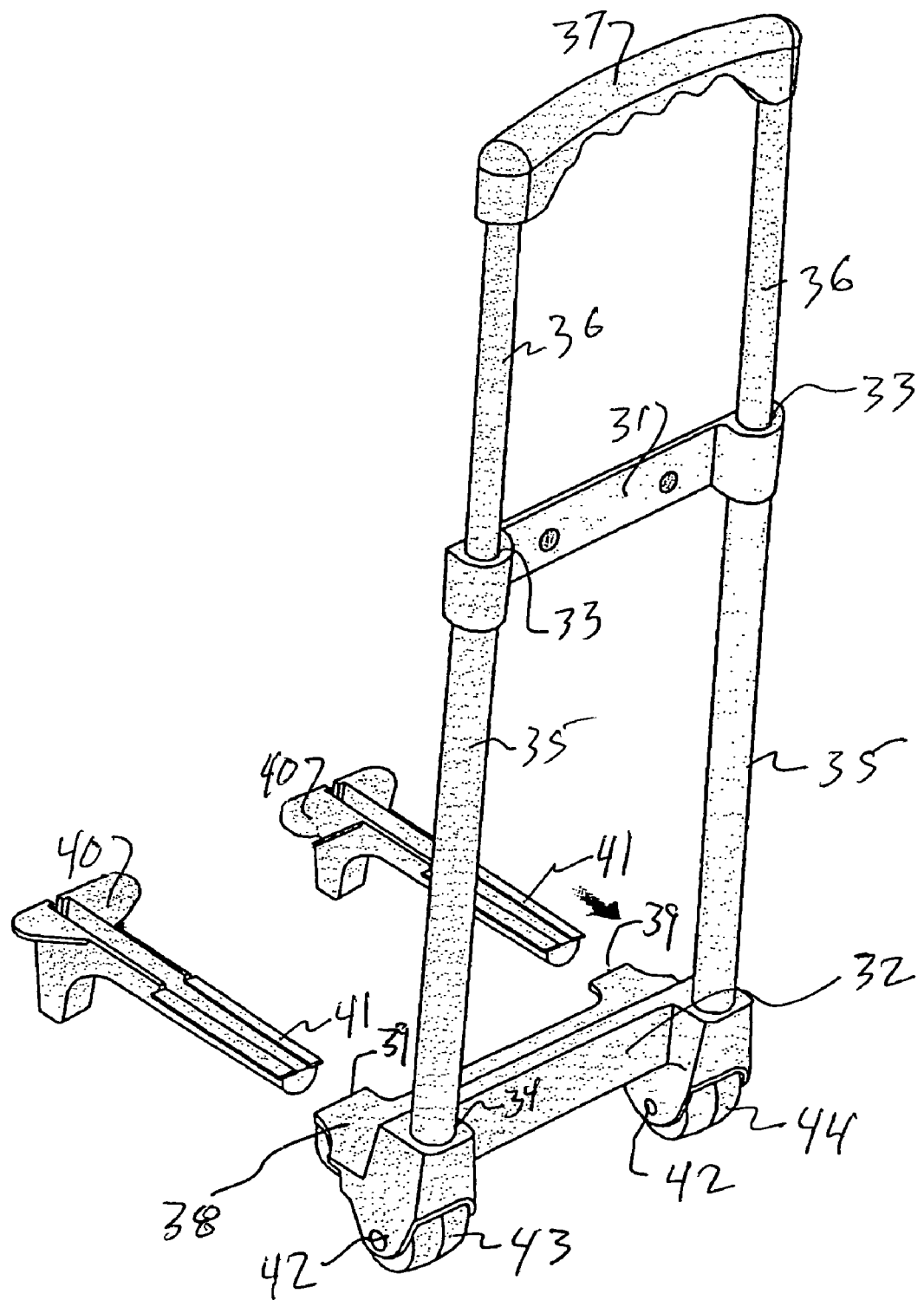
FIG. 4 is an exploded perspective view of the trolley hardware before attachment to the trolley rear wall.

In accordance with the principles of the invention, a simple readily attachable and removable trolley construction is formed by a trolley frame comprising an upper trolley bracket 31, a lower trolley bracket 32 supporting forwardly projecting feet. The upper bracket 31 includes apertures 33; the lower bracket 32 includes apertures 34. The apertures 33, 34 support vertical tubes 35 into which the vertical legs 36 of the U-shaped handle 37 are telescopically mounted. The legs 36 include friction members (not shown) which keep the handle portion retained within the tubes 35 and permit the telescopic deployment of the handle 37 from a fully retracted position in which the handle is inserted into the tubes into the extended position shown in FIG. 4 for towing the backpack.

The bracket 32 mounts axles 42 which support wheels 43, 44.

Figure 8:
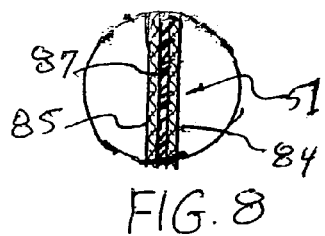
FIG. 8 is a fragmentary cross-section of the support panel.

The bracket 32 includes a forwardly projecting platform portion 38 with forwardly opening slots 39 which are adapted to receive the rear ends 41 of feet 40. Feet 40 may be inserted into the frame to provide a simple trolley construction. In accordance with the principles of the invention, the trolley hardware is attached by rivets 50 to a rigid trolley support panel 51 (FIG. 1), which is congruent to the rear wall panel 11 of the backpack. The support panel 51 is a laminate formed of backpack fabric 84, stiffener panel of plastic or paperboard 87 and liner fabric 85 (FIG. 8).

Figure 1:
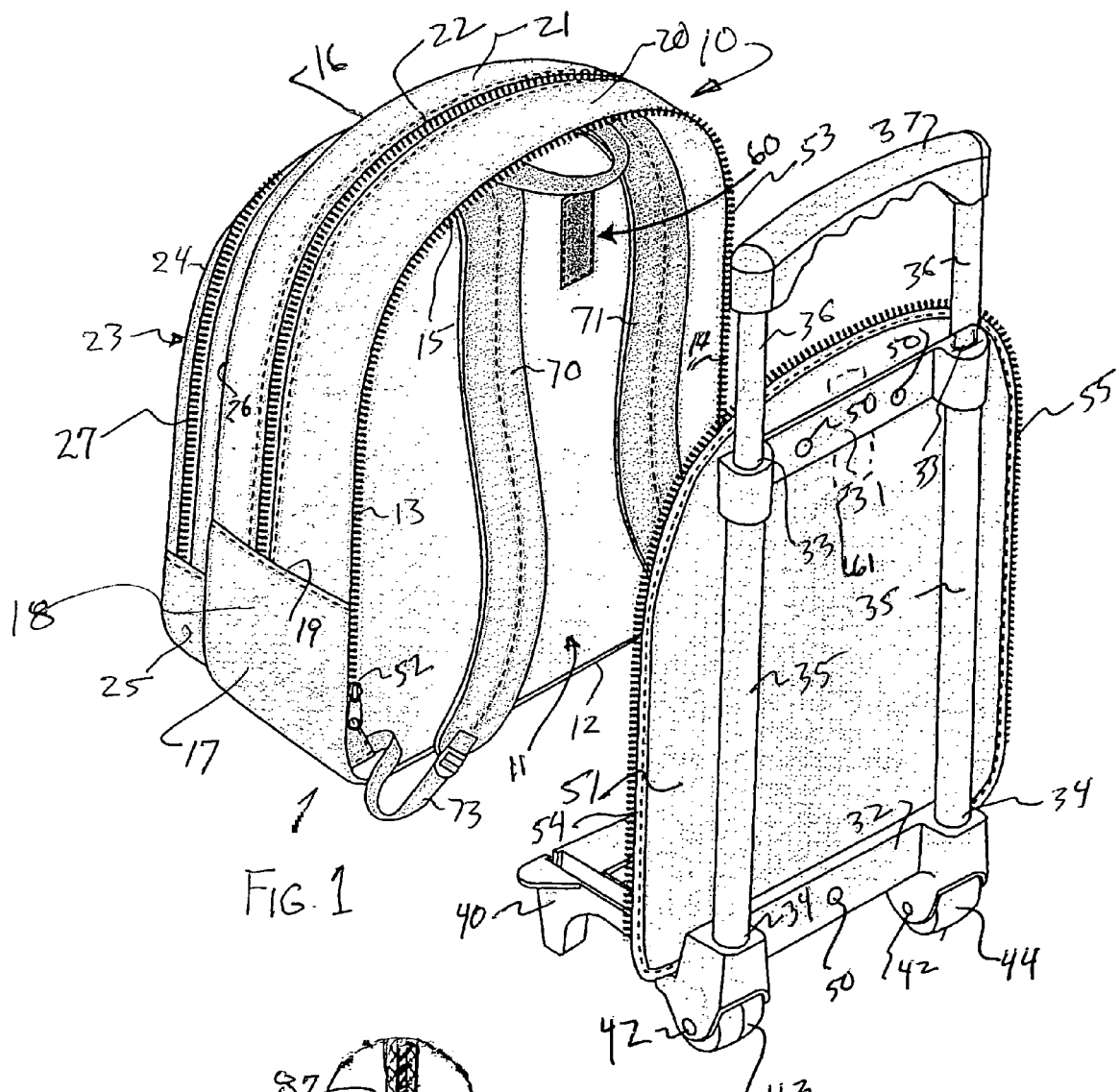
FIG. 1 is an exploded perspective view of the backpack body and trolley assembly ready for attachment of the trolley to the backpack body.
Figure 2:
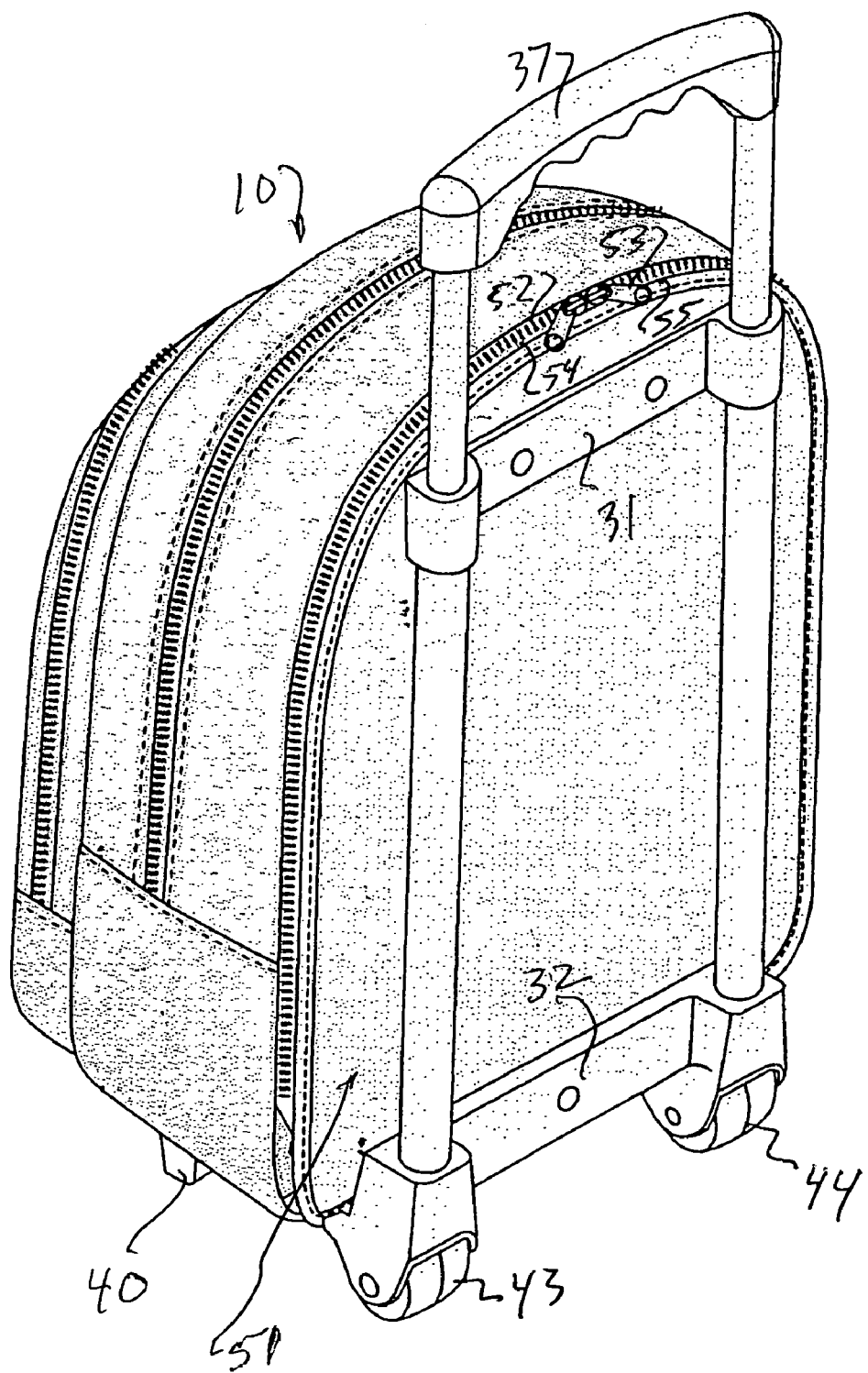
FIG. 2 is a perspective view of the trolley assembled with the backpack body.

In accordance with the invention, zipper portions 52 and 53 are attached to the periphery of the backpack and mate with corresponding zipper portions 54, 55 circumscribing the periphery of the trolley support panel 51 as shown in FIGS. 1 and 2.

Figure 3:
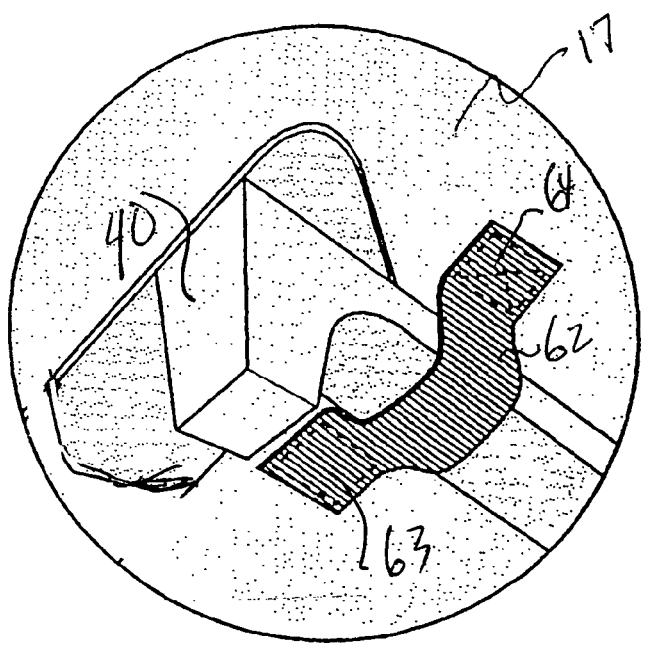
FIG. 3 is an enlarged fragmentary perspective bottom view of the attachment of one of the trolley feet to the bottom of the backpack.
Figure 5:
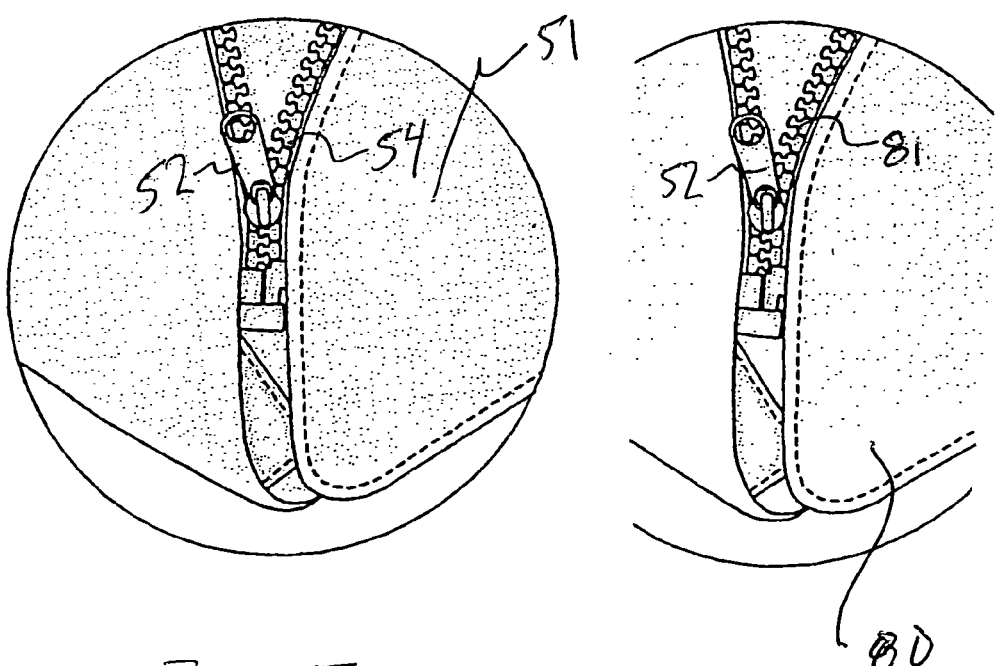
FIG. 5 is an enlarged perspective view of a lower rear corner of the backpack-trolley combination showing the selective zipper attachment of the trolley or the cushioned back pad to the backpack body rear wall.

The rear wall of the backpack also includes a vertically disposed hook and loop locating strip 60 adapted to mate with the corresponding strip 61 attached to the trolley support wall 51. Thus the trolley can be quickly attached to the backpack by connecting the mating zipper portions 52, 54 and 53, 55 as shown in FIGS. 2 and 5. To further secure the backpack to the trolley, hook and loop fastening strips 62 are sewn to the bottom panel 17 at 63 as indicated in FIG. 3, with the free end of the strip 62 being selectively attachable or detachable to a mating hook and loop fastening strip 64 also sewn to the bottom wall 17 as shown in FIG. 3.

Thus it will be understood that the trolley assembly may be made of lightweight materials readily assembled by simply inserting the feet 40 into the bracket 32 and then lining up the hook and loop fastening strips 60, 61 and zipping the zipper portions 52, 54 and 53, 55 together. This will seal the carrying shoulder straps 70, 71 for towing the backpack as a piece of luggage on the wheeled trolley. When the backpack is to be used simply as a backpack, the trolley may be detached by unzipping the zipper portions 52, 54 and 53, 55, disconnecting the hook and loop connection of the strips 60, 61 and 62, 64 to separate the trolley from the backpack. The trolley may be stowed, if desired, in the separate nylon bag (not shown), which is provided as part of the combination luggage and may be itself stowed in the major backpack compartment or in the front pocket 23.

Figure 6:
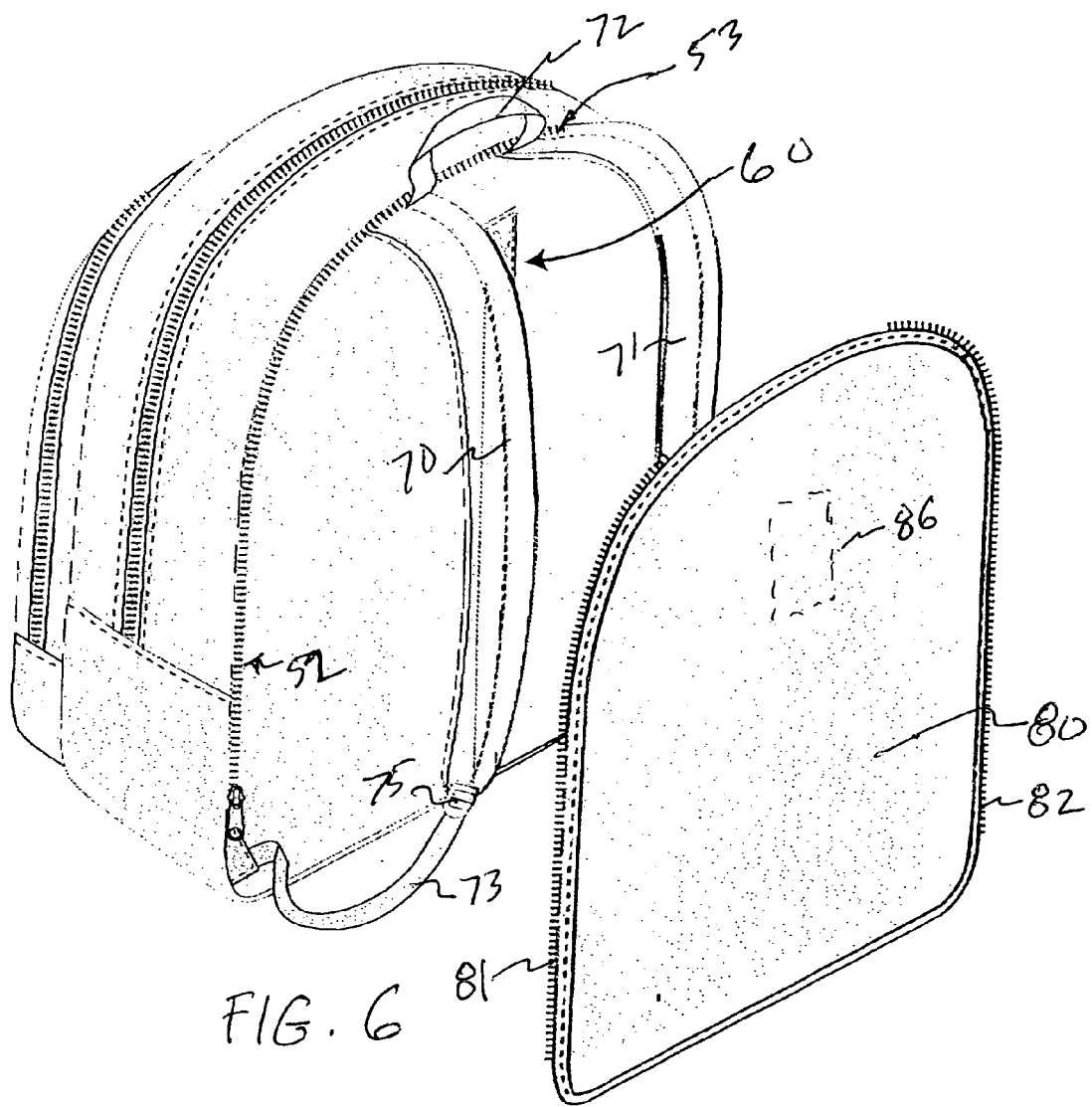
FIG. 6 is an exploded perspective view of the backpack body and cushioned back pad ready for assembly.
Figure 9:
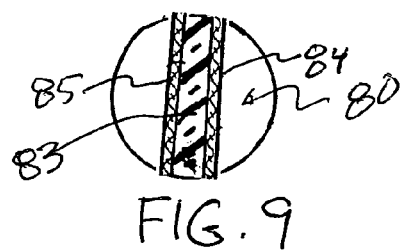
FIG. 9 is a fragmentary cross-section of the cushioned back pad.
Figure 7:
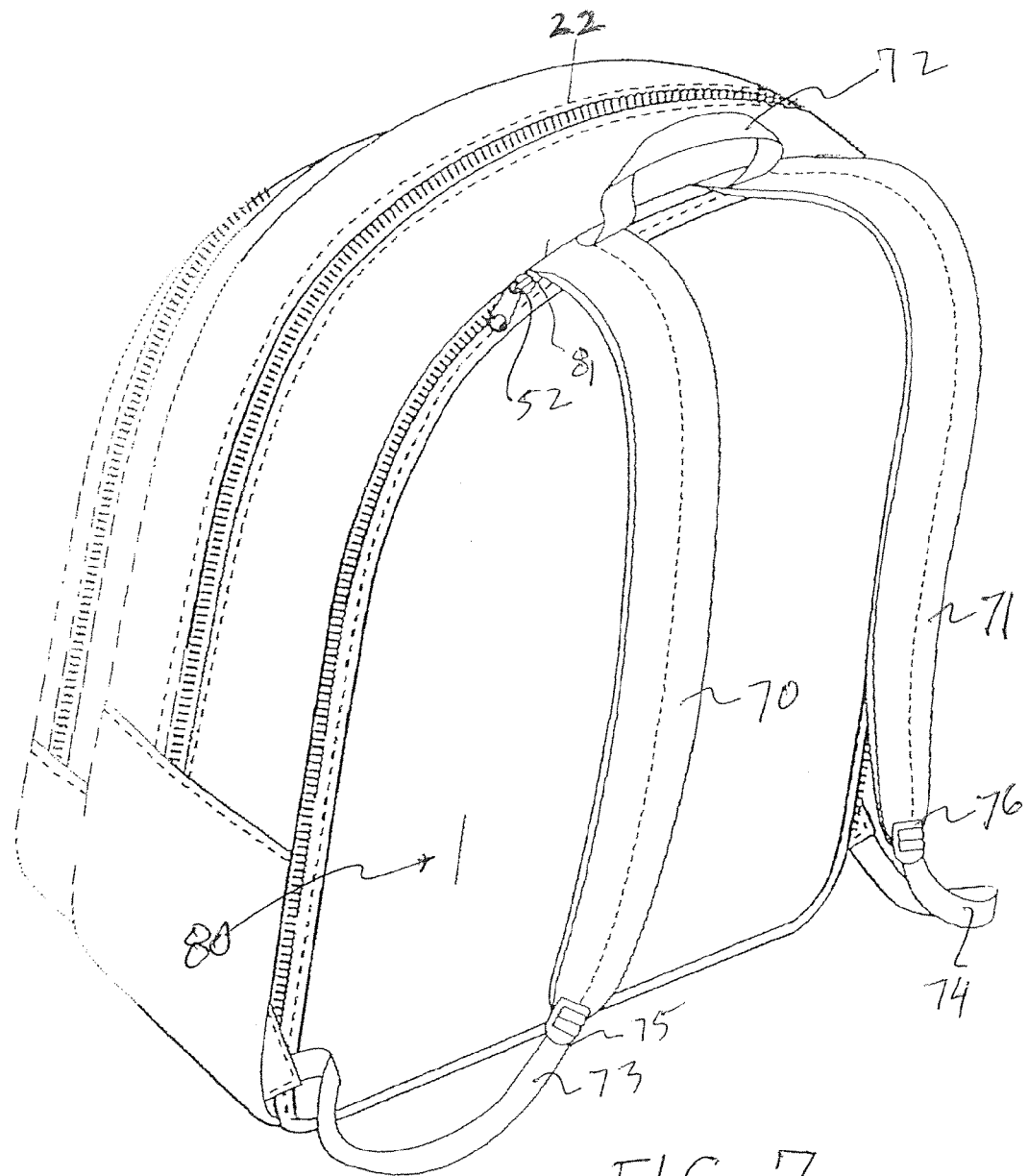
FIG. 7 is a perspective view of the back pad assembled with the backpack body.

When the trolley 30 is removed from the backpack 10, a separate padded panel 80, a laminate of a foam core 83 sandwiched between backpack fabric 84 and liner fabric 85 (FIG. 9) may be attached to the rear wall 12 utilizing the zipper elements 52, 53. The panel 80 is congruent in shape with the wall 12 and has zipper elements 81, 82 sewn about its periphery as shown in FIG. 6. A hook and loop fastening strip 86 is sewn on the inside of the panel to the liner fabric 85 for mating connection to hook and loop fastening strip 60. Specifically, the panel 80 is zipped onto the wall 12, as shown in FIGS. 6 and 7, by connecting the zipper strips 52, 81 and 52, 82 with the shoulder straps 70, 71 and carrying handle 72 exposed and deployed externally of the padded panel.

It will be appreciated that the new combination trolley-backpack may be simply manufactured from readily available materials and its construction is such that it will be of lightweight but sturdy construction and it may be readily attached and detached from the backpack.

Although the foregoing description has been given by way of a preferred embodiment, it will be understood by those skilled in the art that other forms of the invention falling within the ambit of the following claims are contemplated. Accordingly, reference should be made to the following claims in determining the full scope of the invention.

I claim:

1. A backpack combination comprising,
   (a) a storage compartment having a front wall, a rear wall, a bottom wall, first and second side walls, and a top wall;
   (b) shoulder straps affixed to said rear wall at upper and lower portions thereof;
   (c) a first and second zipper means extending along the periphery of said rear wall from lower to upper portions thereof;
   (d) a padded back panel congruent with said rear wall and having third and fourth zipper means along peripheral portions thereof adapted for selective connection to said first and second zipper means;
   (e) a compact trolley assembly that is selectively attachable and detachable from said storage compartment comprising:
   a rigid planar support panel congruent with said rear wall;
   a rectangular frame affixed to said rigid planar support panel, said rectangular frame having upper and lower horizontal bracket members secured to said planar support panel;
   said upper horizontal bracket members having vertical tubes to which a U-shaped projectible handle is disposed;
   means to frictionally lock said projectible handle at its fully extended position;
   said lower horizontal bracket members having downward depending axle supports, said downward depending axle supports supporting axles aid wheels; and
   said planar support panel having fifth and sixth zipper means along peripheral portions thereof adapted for selective connection to said first and second zipper means.

2. The backpack of claim 1, further characterized in that said compact trolley assembly includes a platform and wheels.

3. The backpack of claim 2, further characterized in that said platform includes selectively removable foot elements.

4. The backpack of claim 3, further characterized in that
(a) said bottom wall of said storage compartment includes strap means for selectively engaging said foot elements.

5. The backpack of claim 1 further characterized in that
(a) said rear wall includes a first hook and loop fastening strip;
(b) said back panel includes a second hook and loop fastening strip adapted to be selectively connected to said first strip, and
(c) said support panel includes a third hook and loop fastening strip adapted to be selectively fastened to said first strip.

6. The backpack of claim 1, further characterized in that
(a) said shoulder straps include length adjusting means.

* * * * *